United States Patent
Ren et al.

(10) Patent No.: US 8,122,712 B2
(45) Date of Patent: Feb. 28, 2012

(54) EXHAUST SYSTEM WITH IMPROVED $NO_x$ EMISSION CONTROL

(75) Inventors: Shouxian Ren, Ann Arbor, MI (US); Ryu Hariyoshi, Novi, MI (US)

(73) Assignee: GM Global Technology Operations LLC

( * ) Notice: Subject to any disclaimer, the term of this patent is extended or adjusted under 35 U.S.C. 154(b) by 960 days.

(21) Appl. No.: 12/107,302

(22) Filed: Apr. 22, 2008

(65) Prior Publication Data

US 2009/0173064 A1    Jul. 9, 2009

Related U.S. Application Data

(60) Provisional application No. 61/018,744, filed on Jan. 3, 2008.

(51) Int. Cl.
*F01N 3/10* (2006.01)

(52) U.S. Cl. ............. 60/299; 60/274; 60/297; 60/301; 60/303

(58) Field of Classification Search .......... 60/274, 60/286, 295, 297, 299, 301, 303, 311
See application file for complete search history.

(56) References Cited

U.S. PATENT DOCUMENTS 6,471,924 B1 * 10/2002 Feeley et al. ............... 423/213.5
(Continued)

FOREIGN PATENT DOCUMENTS

| JP | 2002-089246 A | 3/2002 |
| WO | WO2004/076829 | 9/2004 |
| WO | WO2004/111401 | 12/2004 |

*Primary Examiner* — Binh Q Tran

(57) ABSTRACT

An exhaust system includes a selective catalytic reduction (SCR) unit and a $NO_x$ absorber that may include a lean $NO_x$ trap (LNT). The $NO_x$ absorber absorbs $NO_x$ and releases the $NO_x$ absorbed in the $NO_x$ absorber into the SCR unit. The SCR unit converts $NO_x$ of exhaust gas into nitrogen and water.

22 Claims, 3 Drawing Sheets

U.S. PATENT DOCUMENTS

| | | | |
|---|---|---|---|
| 6,766,642 B2 * | 7/2004 | Binder et al. | 60/301 |
| 6,973,776 B2 * | 12/2005 | van Nieuwstadt et al. | 60/286 |
| 7,472,545 B2 * | 1/2009 | Hemingway et al. | 60/286 |
| 7,640,730 B2 * | 1/2010 | Gandhi et al. | 60/297 |
| 7,650,746 B2 * | 1/2010 | Hu et al. | 60/286 |
| 7,685,813 B2 * | 3/2010 | McCarthy, Jr. | 60/295 |
| 7,926,263 B2 * | 4/2011 | Stroh et al. | 60/295 |

\* cited by examiner

EXHAUST SYSTEM WITH IMPROVED $NO_x$ EMISSION CONTROL

CROSS-REFERENCE TO RELATED APPLICATIONS

This application claims the benefit of U.S. Provisional Application No. 61/018,744, filed on Jan. 3, 2008. The disclosure of the above application is incorporated herein by reference.

FIELD

The present disclosure relates to exhaust systems for internal combustion engines, and more particularly to exhaust systems using selective catalytic reduction (SCR) units for emission control.

BACKGROUND

The background description provided herein is for the purpose of generally presenting the context of the disclosure. Work of the presently named inventors, to the extent that it is described in this background section, as well as aspects of the description that may not otherwise qualify as prior art at the time of filing, are neither expressly nor impliedly admitted as prior art against the present disclosure.

Selective catalytic reduction (SCR) catalysts and diesel oxidation catalysts (DOC) are commonly used with diesel engines for emissions reduction. In the SCR process, nitrogen oxide ($NO_x$) reacts with a reductant which is injected by a dosing system into the exhaust gas stream to be absorbed onto an SCR catalyst. The injected dosing agent (e.g. urea) breaks down to form ammonia ($NH_3$). $NH_3$ is the reductant that is utilized to react with $NO_x$ to reduce $NO_x$ into nitrogen ($N_2$) and water ($H_2O$).

The SCR process typically requires relatively high exhaust gas temperatures (such as temperatures greater than 200° C.). Traditional diesel engines, however, generate an exhaust gas of low temperatures, generally below 200° C., at cold start and under low load operating conditions. During a cold start phase of a FTP-75 cycle (the Bag I or Phase I of Federal Test Procedures for emission testing), even with a preliminary warm-up strategy, the highest temperature of the SCR unit may still be lower than the temperature required to make the SCR unit effective in reducing $NO_x$ emission.

SUMMARY

Accordingly, an exhaust system is provided and includes a selective catalytic reduction (SCR) unit and an $NO_x$ absorber. The $NO_x$ absorber absorbs $NO_x$ of exhaust gas and releases the $NO_x$ absorbed in the $NO_x$ absorber into the SCR unit. The SCR unit converts $NO_x$ of exhaust gas into nitrogen and water.

In other features, a method of operating an exhaust system is provided and includes absorbing $NO_x$ of exhaust gas in an $NO_x$ absorber, releasing the $NO_x$ absorbed in the $NO_x$ absorber into an SCR unit, and converting the $NO_x$ released from the $NO_x$ absorber into nitrogen and water.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

Figure 1:
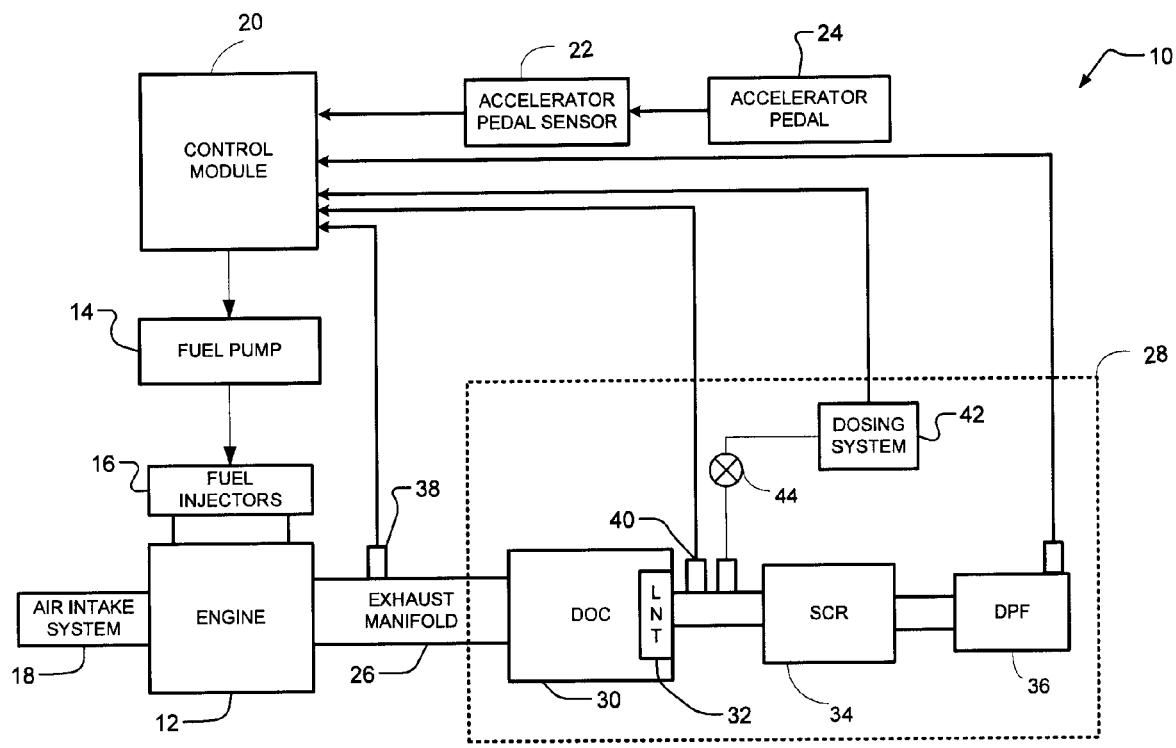
FIG. 1 is a block diagram of a vehicle including an emission control system in accordance with the teachings of the present disclosure.

The following description is merely exemplary in nature and is not intended to limit the present disclosure, application, or uses. It should be understood that throughout the drawings, corresponding reference numerals indicate like or corresponding parts and features.

An exhaust system according to the present disclosure may include a diesel oxidation catalyst (DOC) integrated with a nitrogen oxide ($NO_x$) absorber disposed upstream from a selective catalyst reduction (SCR) unit. The $NO_x$ absorber may absorb $NO_x$ of exhaust gas when the SCR unit cannot effectively reduce $NO_x$ emission during an engine start-up period. The $NO_x$ absorber may release the absorbed $NO_x$ after the exhaust gas reaches a predetermined temperature where the SCR unit can effectively convert $NO_x$ into nitrogen and water. As a result, $NO_x$ emission released to the atmosphere during the engine start-up period may be reduced.

Referring to FIG. 1, a vehicle 10 including an emission control system in accordance with teachings of the present disclosure is shown. Fuel is delivered to a diesel engine 12 from a fuel pump 14 through a plurality of fuel injectors 16. Air is delivered to the engine 12 through an air intake system 18.

A control module 20 communicates with an accelerator pedal sensor 22. The accelerator pedal sensor 22 sends a signal representative of a pedal position of an accelerator pedal 24 to the control module 20. The control module 20 uses the pedal position signal in controlling operation of the fuel pump 14 and the fuel injectors 16.

Exhaust is produced through the combustion process and is exhausted from the engine 12 into an exhaust manifold 26. An exhaust system 28 receives the exhaust from the engine 12 through the exhaust manifold 26 and treats the exhaust flowing there through to reduce $NO_x$ before the exhaust is released to the atmosphere.

The exhaust system 28 includes a diesel oxidation catalyst (DOC) 30, an $NO_x$ absorber in the form of a lean $NO_x$ trap (LNT) catalyst 32, a selective catalytic reduction (SCR) unit 34 and a diesel particulate filter (DPF) 36. The $NO_x$ absorber is integrated in the DOC 30. A first $NO_x$ sensor 38 is provided at the exhaust manifold 26 and a second $NO_x$ sensor 40 is provided between the SCR unit 34 and the DOC 30. A dosing system 42 is provided upstream of the SCR unit 34 for injecting a reductant additive, such as urea, into the exhaust stream. A valve 44 is connected to the dosing system 42 for metering precise amounts of the reductant additive. The gaseous or liquid reductant is added to the exhaust stream and is absorbed onto the SCR unit 34.

The first $NO_x$ sensor 38 senses the exhaust in the exhaust manifold 26 and delivers a signal to the control module 20 indicative, for example, of whether the exhaust is lean or rich. The second $NO_x$ sensor 40 senses the exhaust immediately upstream of the SCR unit 34. The DOC 30 is provided upstream of the SCR unit 34 for oxidizing the exhaust hydrocarbon. The DOC 30 also enhances $NO_x$ absorption efficiency at low temperatures by partially converting NO contained in the exhaust gas into $NO_2$. The DPF 36 is provided downstream of the SCR unit 34 for removing diesel particulate matter or soot from the exhaust.

The SCR unit 34 is used to remove nitrogen oxides ($NO_x$) in the exhaust through a chemical reaction between the exhaust gases, the reductant additive (e.g. urea), and a catalyst on the SCR unit 34. The heat in the exhaust stream causes the aqueous urea solution to decompose into ammonia and hydro-cyanic acid (HNCO). These decomposition products enter the SCR unit 34 where the gas phase ammonia is absorbed and the cyanic acid is further decomposed on the SCR unit 34 to gas phase ammonia. The absorbed ammonia reacts with $NO_x$ in the exhaust gas to form $H_2O$ and $N_2$. The SCR unit 34 may effectively convert $NO_x$ into $H_2O$ and $N_2$ at approximately a predetermined temperature. The predetermined temperature may depend on a number of factors, including but not limited to, SCR composition and density, sizes of the canisters for the DOC 30 and the DPF 36, and/or fuel composition. Generally, the predetermined temperature may be approximately 200° C. (for example only).

Figure 2:
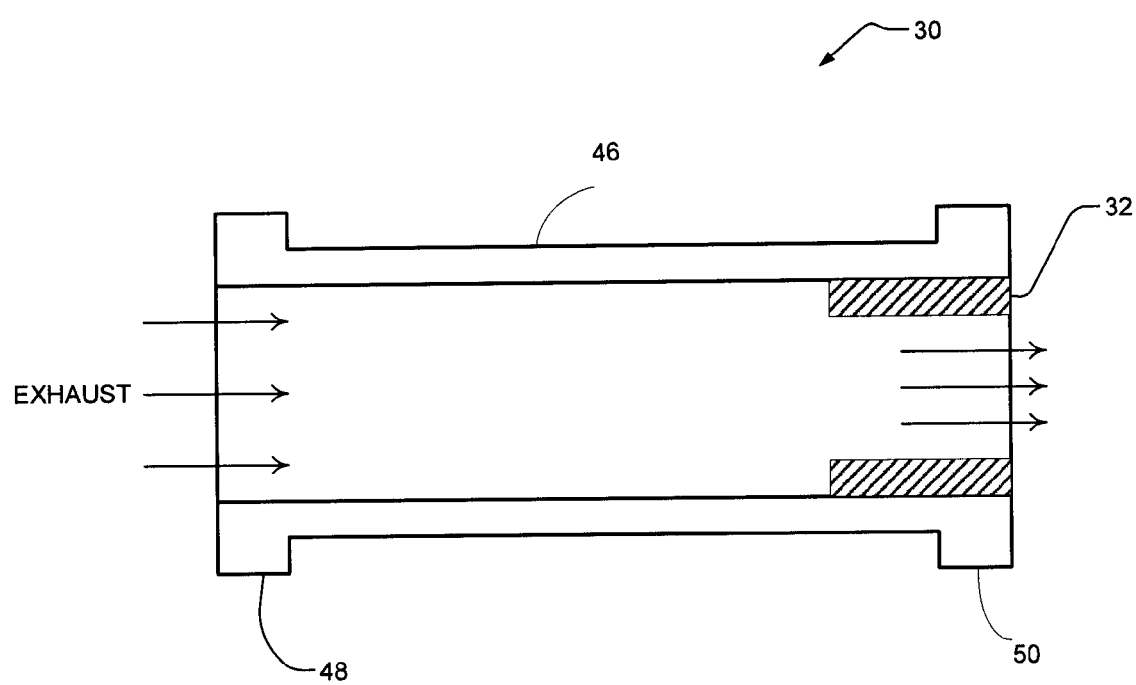
FIG. 2 is a schematic diagram of a diesel oxidation catalyst (DOC) incorporating a lean $NO_x$ trap (LNT) catalyst.

Referring to FIG. 2, the DOC 30 may have a cylindrical shape and may include a substrate 46 with one or more catalyst layers and washcoat layers. The substrate 46 has an inlet end 48 and an outlet end 50. An $NO_x$ absorber, such as a lean $NO_x$ trap (LNT) catalyst 32, is provided adjacent to the outlet end 50 of the DOC 30. The LNT catalyst 32 may include a brick separately mounted to the DOC 30 by catalytic brick physical integration. Alternatively, the LNT catalyst 32 may be a section of a catalyst washcoat in the DOC brick at the outlet end 50 by a zone coating technique. The LNT catalyst 32 may absorb and store $NO_x$ from exhaust passing through the DOC 30.

It should be understood and appreciated that any form of $NO_x$ absorber known in the art other than the LNT catalyst 32 can be used without departing from the spirit of the present disclosure. Moreover, the LNT catalyst 32 may be provided outside the DOC 30. Further, the DOC 30 may have a shape other than a cylindrical shape. For example, the DOC 30 may have an oval shape.

Figure 3:
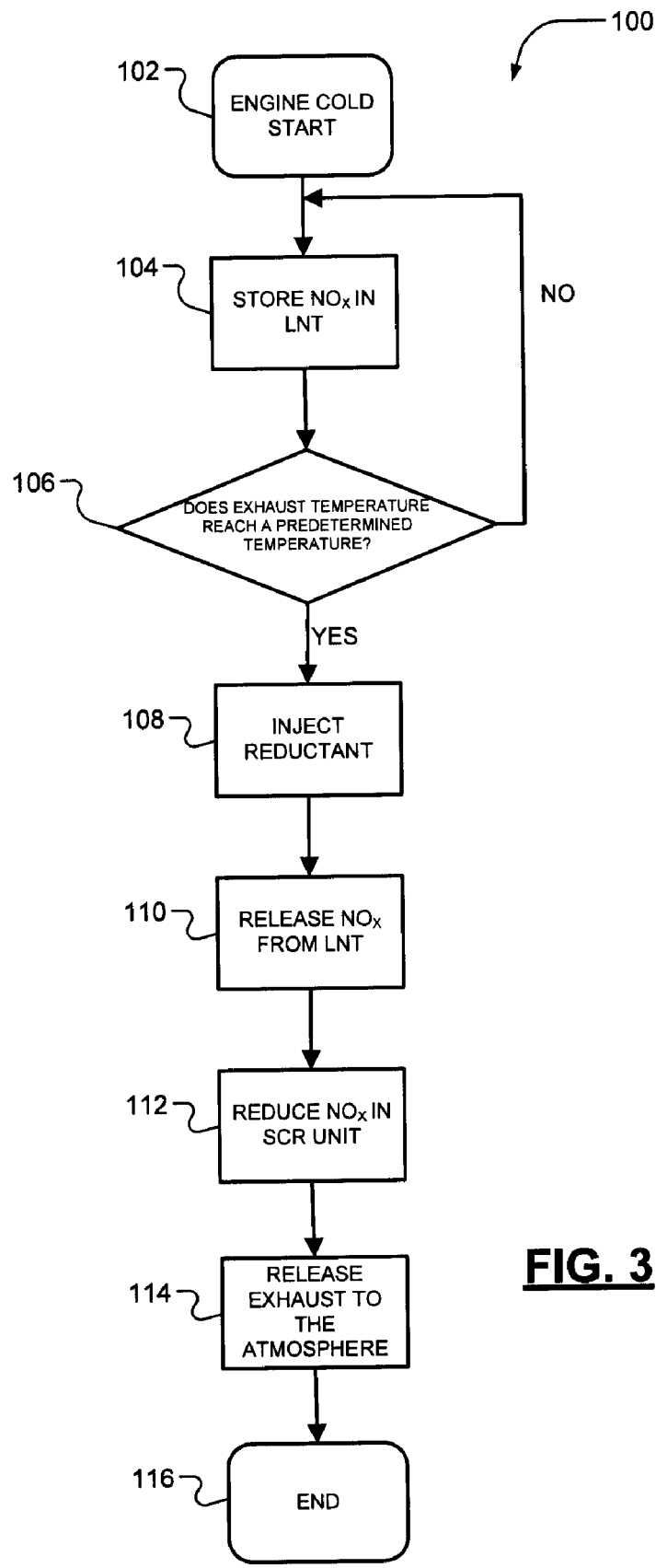
FIG. 3 is a flow diagram of a method of operating an exhaust system according to the teachings of the present disclosure.

Referring to FIG. 3, a method 100 of operating an exhaust system 28 begins in step 102. In step 102, when the engine starts and operates under cool exhaust temperatures, for example, during the cold start phase of FTP-75 cycle (of the Federal Test Procedure), or under certain low load engine operating conditions, the catalyst of the SCR unit 34 cannot effectively reduce sufficient amount of $NO_x$ due to the low temperature. Generally, the SCR unit 34 can effectively convert $NO_x$ into nitrogen ($N_2$) and water ($H_2O$) when the exhaust and hence the SCR unit 34 reach a predetermined temperature. When the exhaust temperature is low and below the predetermined temperature, $NO_x$ contained in the exhaust may be absorbed and stored in the LNT catalyst 32 in step 104. The LNT catalyst 32 can effectively absorb and store $NO_x$ when the temperature of the exhaust gas is below the predetermined temperature. Additionally, the DOC 30 converts a percentage of NO into $NO_2$ when the exhaust temperature is low. As a result, the amount of $NO_x$ released into the atmosphere is reduced when the SCR unit 34 is not effective in reducing the $NO_x$ emission.

As the engine continues to run, the temperature of the exhaust, and consequently the exhaust system 28, increases. In step 106, when the temperature of the exhaust gas reaches the predetermined temperature, the catalyst in the SCR unit 34 becomes effective in reducing $NO_x$ emission. At this point, the dosing system 42 may start to inject the reductant, e.g., urea, to the exhaust in step 108. $NO_x$ contained in the exhaust may begin to undergo an SCR process in the SCR unit 34 so that the harmful $NO_x$ is reduced into $H_2O$ and $N_2$.

In general, the $NO_x$ storage capability of the LNT catalyst 32 deteriorates as the exhaust temperature increases. Therefore, in step 110, as the temperature of the exhaust continues to increase, the heat from the exhaust stream causes the LNT catalyst 32 to release the $NO_x$ previously stored when the exhaust temperature is low. In step 112, the released $NO_x$ is directed to the SCR unit 34 for the SCR process. After the exhaust gas undergoes the SCR process in the SCR unit 34, the exhaust gas may be directed to the DPF 36 where diesel particulate matter or soot is removed. The treated exhaust gas is then released to the atmosphere in step 114 and the whole process ends in step 116.

In general, the $NO_x$ absorber (the LNT catalyst 32 in the illustrative example) absorbs $NO_x$ and releases $NO_x$ absorbed in the $NO_x$ absorber based on temperatures of the exhaust gas. The SCR unit 34 coverts $NO_x$ released from the $NO_x$ absorber based on temperatures of the exhaust gas. The timing for releasing $NO_x$ from the $NO_x$ absorber to the SCR unit 34 may vary depending on chemical compositions of the $NO_x$ absorber.

The LNT catalyst 32 is provided primarily for the purpose of absorbing and storing $NO_x$ during engine cold-start phase, not for $NO_x$ reduction. Therefore, the exhaust system 28 of the present disclosure requires only a small amount of LNT catalyst 32 sufficient to absorb $NO_x$ during the engine cold start phase or under low load operating conditions, as opposed to traditional exhaust systems that use the LNT catalyst for $NO_x$ reduction for the entire period of engine running. Given the small amount of the LNT catalyst 32, the LNT catalyst 32 can be in the form of a brick or a washcoat layer mounted in the DOC 30. Therefore, the addition of the LNT catalyst 32 does not increase the space conventionally required for the exhaust system 28.

Moreover, with the inclusion of the LNT catalyst 32 upstream of the SCR unit 34 for low temperature $NO_x$ absorption, the present exhaust system 28 does not necessarily need an external heating means conventionally required in the traditional exhaust system 28 for shortening the cold-start phase. Therefore, the exhaust system 28 of the present disclosure has improved emission control performance without increasing fuel consumption. Further, because the LNT catalyst 32 may temporarily store $NO_x$ at low temperatures and automatically release the stored $NO_x$ for SCR process at high temperatures, exhaust lean-rich modulation commonly required in the traditional exhaust systems for regenerating the LNT catalyst is not required.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. An exhaust system comprising:
    a selective catalytic reduction (SCR) unit for converting $NO_x$ of exhaust gas into nitrogen and water;
    an $NO_x$ absorber that absorbs $NO_x$ of the exhaust gas and that releases the $NO_x$ absorbed in the $NO_x$ absorber into the SCR unit; and
    a diesel oxidation catalyst (DOC) that is upstream of the SCR unit and that oxidizes hydrocarbons,
    wherein the $NO_x$ absorber is disposed adjacent to an outlet of the DOC, and
    wherein the $NO_x$ absorber comprises a washcoat layer mounted to the DOC.

2. The exhaust system of claim 1 wherein the $NO_x$ absorbs $NO_x$ and releases the $NO_x$ absorbed in the $NO_x$ absorber based on temperature of the exhaust gas.

3. The exhaust system of claim 1 wherein the SCR unit converts the $NO_x$ released from the $NO_x$ absorber based on temperature of the exhaust gas.

4. The exhaust system of claim 1 wherein the $NO_x$ absorber absorbs $NO_x$ at a first temperature and releases the absorbed $NO_x$ at a second temperature, the second temperature higher than the first temperature.

5. The exhaust system of claim 1 wherein the SCR unit is disposed downstream from the $NO_x$ absorber.

6. The exhaust system of claim 1 wherein the $NO_x$ absorber includes a lean $NO_x$ trap (LNT) catalyst.

7. The exhaust system of claim 1 wherein the washcoat layer is formed at an outlet of the DOC by a zone coating technique.

8. The exhaust system of claim 1 further comprising a dosing system disposed downstream from the $NO_x$ absorber and upstream from the SCR unit for injecting a reductant into the exhaust gas.

9. The exhaust system of claim 1 further comprising a diesel particulate filter (DPF) disposed downstream from the SCR unit.

10. A method of operating an exhaust system comprising:
absorbing $NO_x$ of exhaust gas in an $NO_x$ absorber;
releasing the $NO_x$ absorbed in the $NO_x$ absorber into an SCR unit;
oxidizing hydrocarbons in a diesel oxidation catalyst (DOC) implemented upstream of the NOx absorber,
wherein the $NO_x$ absorber is disposed adjacent to an outlet of the DOC, and
wherein the $NO_x$ absorber comprises one of a washcoat layer mounted to the DOC and a brick mounted to the DOC; and
converting the $NO_x$ released from the $NO_x$ absorber into nitrogen and water.

11. The method of claim 10 wherein absorbing $NO_x$ of the exhaust gas, releasing the absorbed $NO_x$, and converting the released $NO_x$ are performed based on temperature of the exhaust gas.

12. The method of claim 10 further comprising absorbing $NO_x$ in the $NO_x$ absorber at a first temperature and releasing the absorbed $NO_x$ at a second temperature, the second temperature higher than the first temperature.

13. The method of claim 10 wherein the $NO_x$ absorber includes a lean $NO_x$ trap (LNT) catalyst.

14. The method of claim 10 wherein the $NO_x$ absorber is disposed upstream of the SCR unit.

15. An exhaust system comprising:
a selective catalytic reduction (SCR) unit for converting $NO_x$ of exhaust gas into nitrogen and water;
an $NO_x$ absorber that absorbs $NO_x$ of the exhaust gas and that releases the $NO_x$ absorbed in the $NO_x$ absorber into the SCR unit; and
a diesel oxidation catalyst (DOC) that is upstream of the SCR unit and that oxidizes hydrocarbons,
wherein the $NO_x$ absorber is disposed adjacent to an outlet of the DOC, and
wherein the $NO_x$ absorber comprises a brick mounted to the DOC.

16. The exhaust system of claim 15 wherein the $NO_x$ absorbs $NO_x$ and releases the $NO_x$ absorbed in the $NO_x$ absorber based on temperature of the exhaust gas.

17. The exhaust system of claim 15 wherein the SCR unit converts the $NO_x$ released from the $NO_x$ absorber based on temperature of the exhaust gas.

18. The exhaust system of claim 15 wherein the $NO_x$ absorber absorbs $NO_x$ at a first temperature and releases the absorbed $NO_x$ at a second temperature, the second temperature higher than the first temperature.

19. The exhaust system of claim 15 wherein the SCR unit is disposed downstream from the $NO_x$ absorber.

20. The exhaust system of claim 15 wherein the $NO_x$ absorber includes a lean $NO_x$ trap (LNT) catalyst.

21. The exhaust system of claim 15 further comprising a dosing system disposed downstream from the $NO_x$ absorber and upstream from the SCR unit for injecting a reductant into the exhaust gas.

22. The exhaust system of claim 15 further comprising a diesel particulate filter (DPF) disposed downstream from the SCR unit.

* * * * *